(12) United States Patent
Liu et al.

(10) Patent No.: US 8,032,653 B1
(45) Date of Patent: Oct. 4, 2011

(54) GUARANTEED BANDWIDTH SHARING IN A TRAFFIC SHAPING SYSTEM

(75) Inventors: Changming Liu, Cupertino, CA (US); Yan Ke, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2358 days.

(21) Appl. No.: 09/658,424

(22) Filed: Sep. 8, 2000

(51) Int. Cl.
G06F 15/16 (2006.01)
G06F 11/00 (2006.01)
G01R 31/08 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. .................................. 709/235; 370/235.1

(58) Field of Classification Search ........ 370/230.1–240, 370/230, 395.21, 468, 395.1, 395.4, 395.2, 370/395.41–395.43, 256, 408
See application file for complete search history.

(56) References Cited

U.S. PATENT DOCUMENTS

| | | | | |
|---|---|---|---|---|
| 5,274,644 A | | 12/1993 | Berger et al. ................. 370/95.1 |
| 5,289,462 A | * | 2/1994 | Ahmadi et al. ............... 370/232 |
| 5,412,647 A | * | 5/1995 | Giroux et al. ................. 370/232 |
| 5,596,576 A | * | 1/1997 | Milito ........................... 370/450 |
| 5,674,003 A | * | 10/1997 | Andersen et al. ............ 709/228 |
| 5,790,534 A | * | 8/1998 | Kokko et al. ................. 370/335 |
| 5,796,719 A | * | 8/1998 | Peris et al. .................... 370/231 |
| 5,796,956 A | * | 8/1998 | Jones ............................ 709/233 |
| 5,864,540 A | * | 1/1999 | Bonomi et al. ............... 370/235 |
| 6,011,775 A | * | 1/2000 | Bonomi et al. ............... 370/230 |
| 6,028,841 A | * | 2/2000 | Lyon et al. .................... 370/232 |
| 6,044,060 A | * | 3/2000 | Jones ......................... 370/230.1 |
| 6,052,379 A | * | 4/2000 | Iverson et al. ................ 370/442 |
| 6,088,360 A | * | 7/2000 | Amaral et al. ................ 370/412 |
| 6,147,970 A | * | 11/2000 | Troxel .......................... 370/235 |
| 6,167,050 A | * | 12/2000 | Chung ........................ 370/235.1 |
| 6,185,210 B1 | * | 2/2001 | Troxel ...................... 370/395.32 |
| 6,192,032 B1 | * | 2/2001 | Izquierdo ..................... 370/230 |
| 6,208,622 B1 | * | 3/2001 | Makrucki ..................... 370/252 |
| 6,247,061 B1 | * | 6/2001 | Douceur et al. ............. 709/240 |
| 6,310,886 B1 | * | 10/2001 | Barton .......................... 370/462 |
| 6,347,077 B1 | * | 2/2002 | Ginzboorg ................... 370/230 |
| 6,349,088 B1 | * | 2/2002 | Ginzboorg et al. ........... 370/230 |
| 6,370,116 B1 | * | 4/2002 | Giroux et al. ................ 370/232 |
| 6,408,005 B1 | * | 6/2002 | Fan et al. ...................... 370/412 |
| 6,424,624 B1 | * | 7/2002 | Galand et al. ................ 370/231 |
| 6,452,933 B1 | * | 9/2002 | Duffield et al. .............. 370/415 |

(Continued)

FOREIGN PATENT DOCUMENTS

WO   WO 98/24208   6/1998

*Primary Examiner* — David England
(74) *Attorney, Agent, or Firm* — Harrity & Harrity, LLP

(57) ABSTRACT

In one aspect the invention provides a method for allocating bandwidth in a network appliance where the network appliance includes a plurality of guaranteed bandwidth buckets used to evaluate when to pass traffic through the network appliance. The method includes providing a shared bandwidth bucket associated with a plurality of the guaranteed bandwidth buckets, allocating bandwidth to the shared bandwidth bucket based on the underutilization of bandwidth in the plurality of guaranteed bandwidth buckets and sharing excess bandwidth developed from the underutilization of the guaranteed bandwidth allocated to the individual guaranteed bandwidth buckets. The step of sharing includes borrowing bandwidth from the shared bandwidth bucket by a respective guaranteed bandwidth bucket to allow traffic to pass immediately through the network appliance.

20 Claims, 3 Drawing Sheets

U.S. PATENT DOCUMENTS

| | | | |
|---|---|---|---|
| 6,483,839 B1 * | 11/2002 | Gemar et al. | 370/395.42 |
| 6,522,628 B1 * | 2/2003 | Patel et al. | 370/230.1 |
| 6,560,195 B1 * | 5/2003 | Basak et al. | 370/230 |
| 6,563,829 B1 * | 5/2003 | Lyles et al. | 370/395.21 |
| 6,611,522 B1 * | 8/2003 | Zheng et al. | 370/395.21 |
| 6,687,247 B1 * | 2/2004 | Wilford et al. | 370/392 |
| 6,801,500 B1 * | 10/2004 | Chandran | 370/230.1 |
| 6,829,649 B1 * | 12/2004 | Shorey et al. | 709/235 |
| 6,839,321 B1 * | 1/2005 | Chiruvolu | 370/230.1 |
| 6,862,270 B1 * | 3/2005 | Ho | 370/328 |
| 6,865,388 B2 * | 3/2005 | Walsh et al. | 455/428 |
| 6,868,063 B1 * | 3/2005 | De Cnodder | 370/236 |
| 6,876,626 B1 * | 4/2005 | Onoe et al. | 370/229 |
| 6,937,561 B2 * | 8/2005 | Chiussi et al. | 370/229 |

* cited by examiner

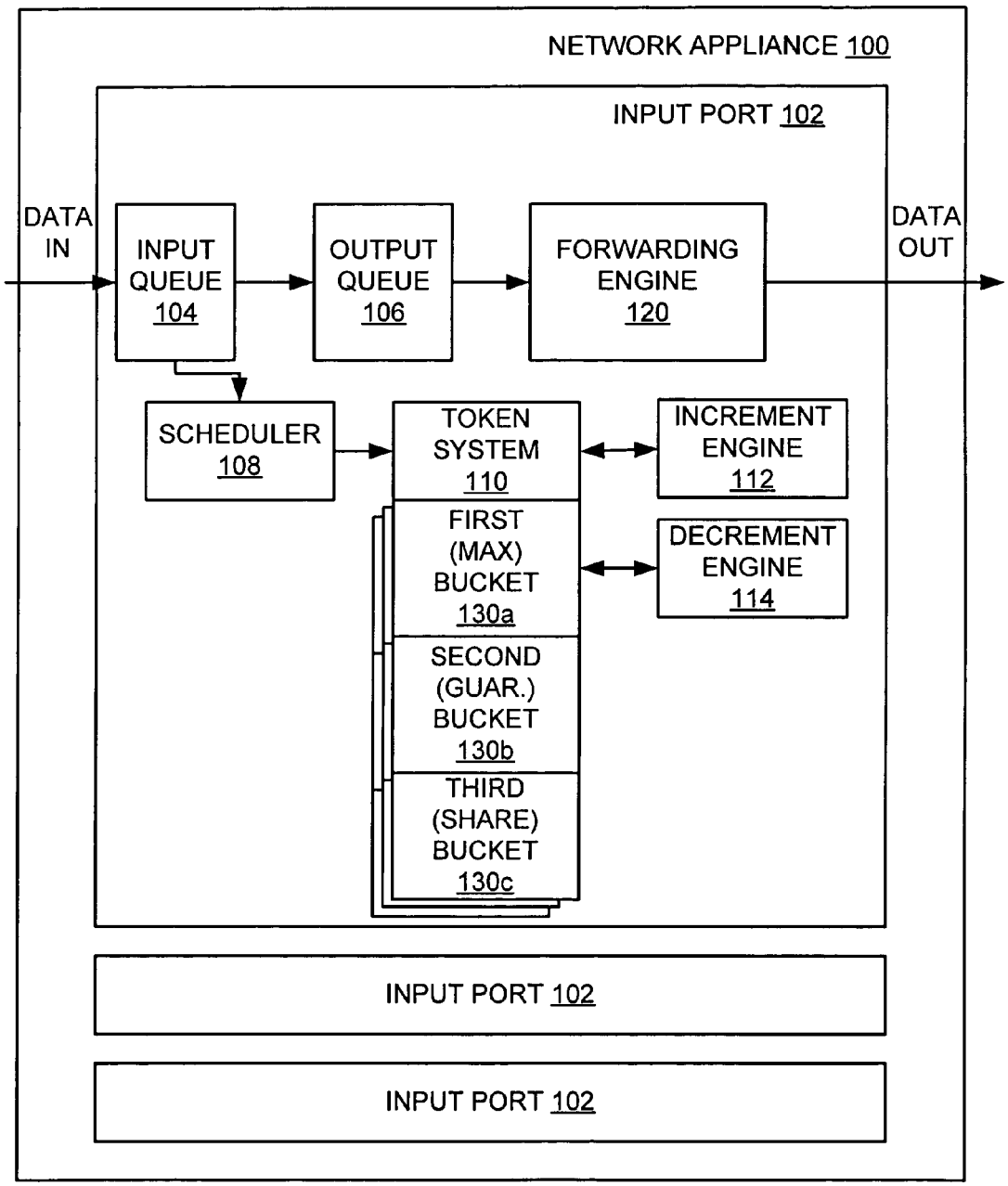
FIG._1

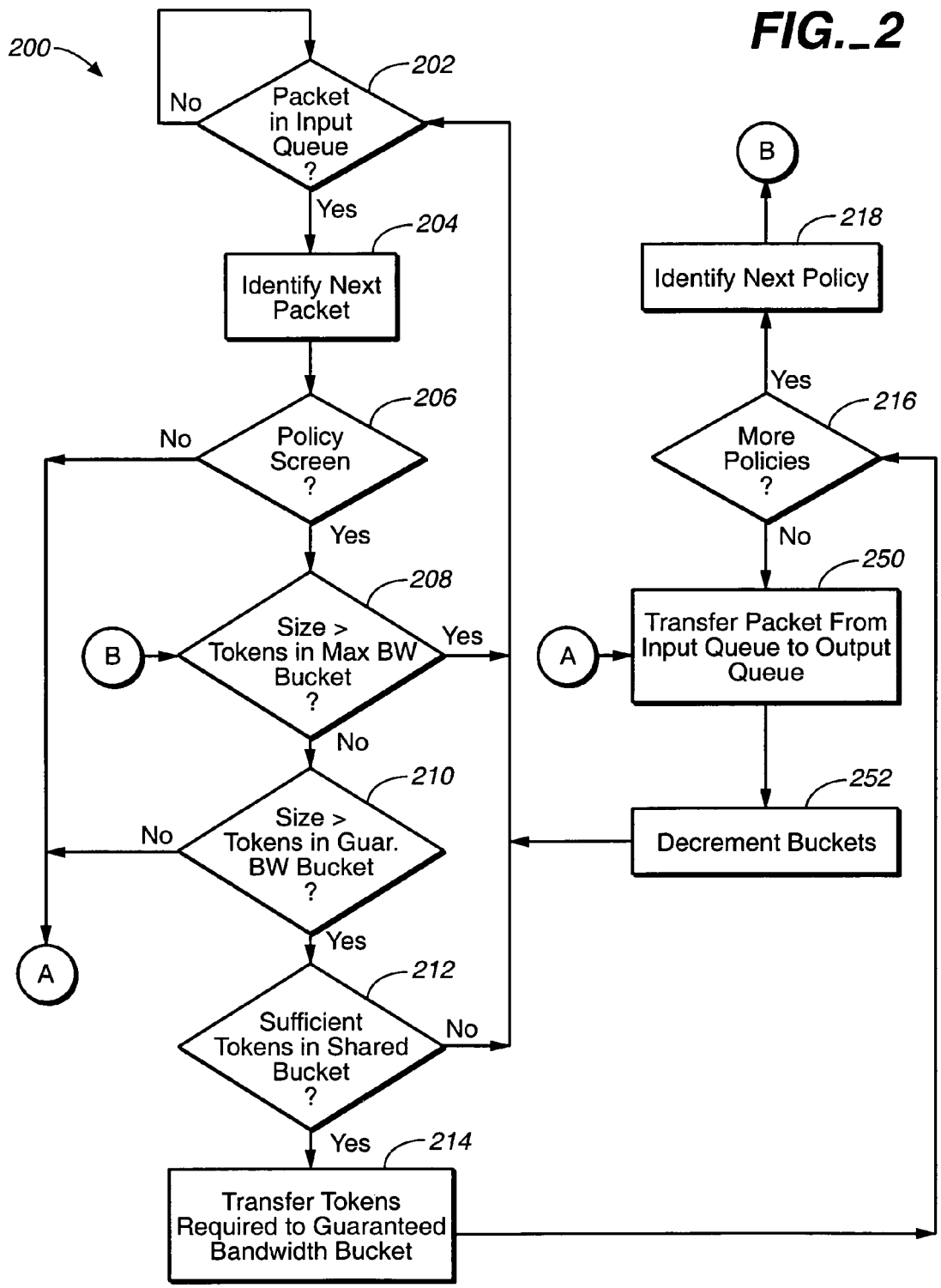
FIG._2

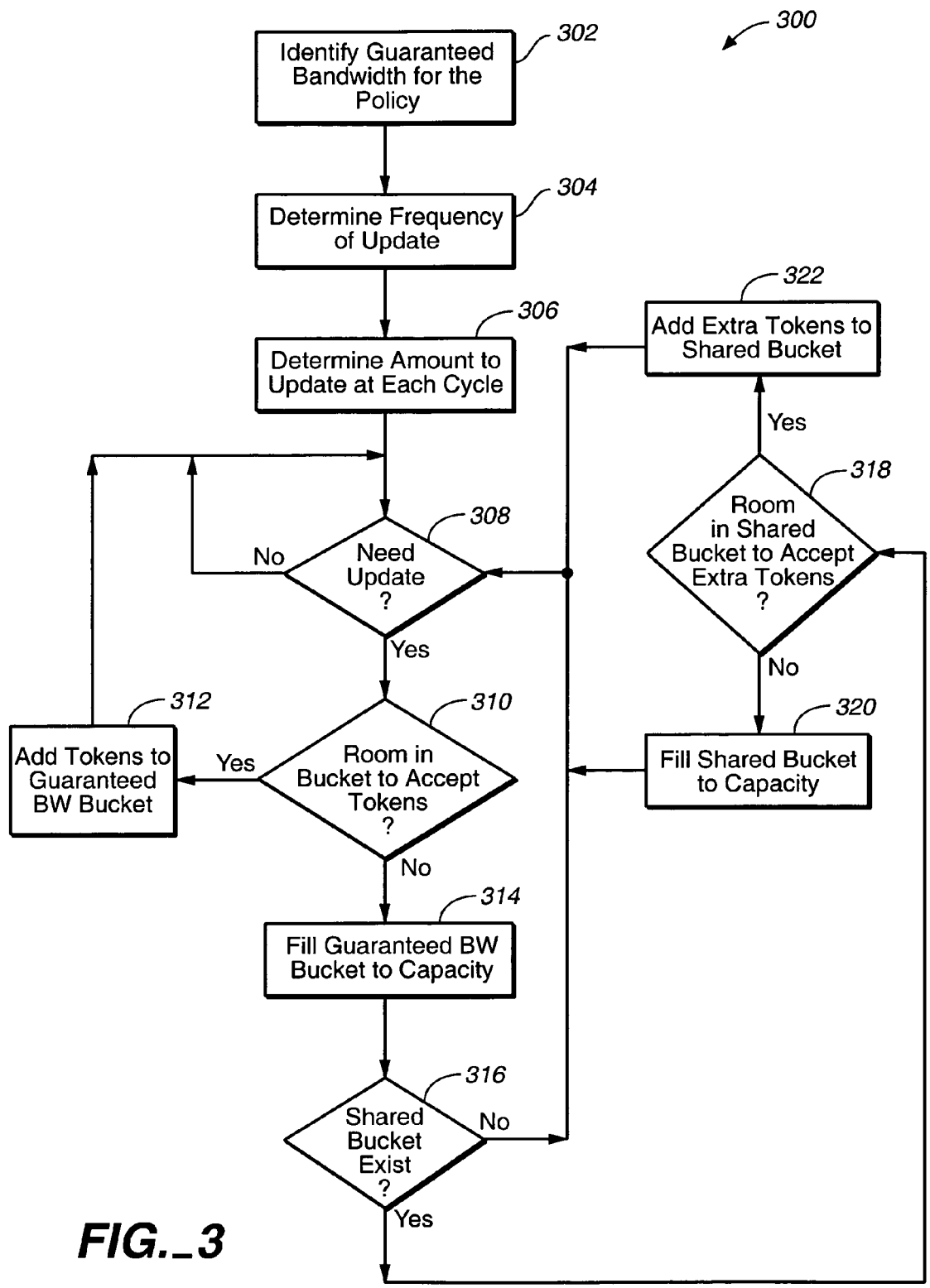
FIG._3

GUARANTEED BANDWIDTH SHARING IN A TRAFFIC SHAPING SYSTEM

TECHNICAL FIELD

The present invention relates generally to electrical computing systems, and more particularly to tools for shaping network traffic in a communication system.

BACKGROUND

There are many emerging trends in the communications world, including the increase in network technology and the proliferation of data networks. To ensure security of communications and to avoid networking congestion problems, network designers have either incorporated security appliances, such as firewalls and virtual private networks, and traffic management devices in their systems or enhanced their routers with these functionalities.

A firewall is an Internet security appliance designed to screen traffic coming into and out of a network location. A virtual private network provides a secure connection through a public network such as the Internet, between two or more distant network appliances using a virtual private networking technology. Traffic management devices are used to monitor and/or control traffic passing through network devices to maintain a network's quality-of-service (QOS) level.

Traffic shaping is a technique for regulating traffic. Traffic shaping refers to a process of analyzing an allocated bandwidth utilized by various types of network traffic through a network appliance. Traffic shaping policies can be used to prioritize users in accordance with an IP address or other criteria to provide different levels of service to different users of a network appliance.

A leaky bucket is one example of a conventional technique used to control traffic flow. A splash is added to the bucket for each incoming byte received by the network appliance when the bucket is not full. The splash results in an increment in a counter associated with the bucket. The bucket leaks away at a constant rate (bytes are allowed to pass from the bucket through the network appliance). When the bucket is full (the counter is at a maximum value), bytes cannot pass through the network appliance (i.e., no additional bytes can be added to the bucket). As the bucket begins to empty in accordance with the leak rate, bytes once again can begin to be added to the bucket so that they can be moved through the network appliance. Leaky buckets are characterized by three parameters: the sustained information rate (SIR), the peak information rate (PIR) and the burst length (BL). The SIR is bound by the long-term data rate and defines the rate that data leaks from the bucket. BL defines the depth of the bucket and is equal to the maximum amount of data allowed to be passed when the bucket is empty. PIR defines the maximum rate at which the source can send data.

A token bucket is another example of a conventional technique used to control traffic flow. With token buckets, tokens are added to the bucket at a constant rate of the SIR. The token is a convention that is used to represent a defined unit of data (e.g., a byte or a packet). The token bucket has a depth of BL. When the token bucket is full no more tokens can be added to the bucket. When data comes in to the network appliance, if there are enough tokens in the token bucket, the data will be passed. Otherwise, the data will be held until the token bucket accumulates enough tokens.

A credit/debit token bucket is another example of a conventional technique used to control traffic flow. In the example discussed above for the token bucket, no data can be passed when there are insufficient tokens in the token bucket. This may cause some unacceptable delays. A credit/debit token bucket allows for oversubscription of tokens. Unlike normal token buckets, the number of tokens in a credit/debit token bucket can be negative. Based on the number of tokens in the bucket, a credit/debit token bucket can be in either one of the three states. If the number of tokens is positive the bucket has credit. If the number of tokens is negative the bucket owes a debit. Otherwise the bucket is in an even state. The operation of a conventional credit/debit token bucket is as follows. Tokens are added to a credit/debit token bucket in the same way as added to a normal token bucket. The difference between a normal token bucket and credit/debit token bucket is how incoming data is handled. In a credit/debit token bucket, as long as the data comes in and the credit/debit token bucket is in the credit or even state, the data is granted permission to pass and the number of tokens is decremented accordingly. After the decrementing operation (to remove the corresponding number of tokens from the bucket based on the amount of data that was passed), the number of tokens in the bucket can be negative, even, or still positive. If data comes in while the credit/debit token bucket is in a debit state, the data is held until the credit/debit bucket returns to the credit or even state (i.e., pays off all of its debt). Thereafter, the network appliance can pass the held data.

As described above a bucket has a definite depth. For example, a token bucket can accept a definite number of tokens before it becomes full. Traditionally, when the bucket became full, the excess (e.g., the excessive tokens) was discarded (i.e., to satisfy a guaranteed bandwidth requirement). If an unlimited or undefined depth bucket were used then the underlying policy may become oversubscribed. In order to ensure that oversubscription does not occur, traditionally these excessive tokens were discarded. What would be desirable is a system that would allow a bucket to share its excess while still providing a guaranteed bandwidth to an associated policy.

SUMMARY

In one aspect the invention provides a method for allocating bandwidth in a network appliance where the network appliance includes a plurality of guaranteed bandwidth buckets used to evaluate when to pass traffic through the network appliance. The method includes providing a shared bandwidth bucket associated with a plurality of the guaranteed bandwidth buckets, allocating bandwidth to the shared bandwidth bucket based on the underutilization of bandwidth in the plurality of guaranteed bandwidth buckets and sharing excess bandwidth developed from the underutilization of the guaranteed bandwidth allocated to the individual guaranteed bandwidth buckets. The step of sharing includes borrowing bandwidth from the shared bandwidth bucket by a respective guaranteed bandwidth bucket to allow traffic to pass immediately through the network appliance.

Aspects of the invention can include one or more of the following features. The shared bandwidth bucket can be a token bucket. The guaranteed bandwidth buckets can be token buckets or credit/debit buckets. Each guaranteed bandwidth bucket can be associated with a traffic shaping policy. A plurality of guaranteed bandwidth buckets can be associated with a single traffic shaping policy. The traffic shaping policy can screen based on IP address. The traffic shaping policy can screen based on the source IP address, the destination IP address, the protocol type, UPD/TCP port number, type of service requested and/or the traffic content.

In another aspect the invention provides a method for allocating bandwidth in a network appliance. The method includes defining a guaranteed bandwidth allocation for a first policy for passing traffic through the network appliance including using a first bucket to allocate the guaranteed bandwidth. A guaranteed bandwidth allocation for a second policy for passing traffic through the network appliance is also defined including using a second bucket to allocate the guaranteed bandwidth. Excess bandwidth developed from the underutilization of the guaranteed bandwidth allocated to the first and second buckets is shared. Sharing includes providing a shared bandwidth bucket associated with first and second buckets and borrowing bandwidth from the shared bandwidth bucket by one of the to first and second buckets when the respective bucket has insufficient bandwidth to allow traffic to pass immediately through the network appliance.

In another aspect, the invention provides an apparatus for allocating bandwidth in a network appliance where the network appliance includes a plurality of guaranteed bandwidth buckets used to evaluate when to pass traffic through the network appliance. The apparatus includes a shared bandwidth bucket associated with a plurality of the guaranteed bandwidth buckets, means for allocating bandwidth to the shared bandwidth bucket based on the underutilization of bandwidth in the plurality of guaranteed bandwidth buckets and a scheduler. The scheduler is operable to evaluate a packet to determine if a traffic shaping policy should be applied to a given packet, evaluate a guaranteed bandwidth bucket associated with an identified traffic shaping policy, determine when the guaranteed bandwidth bucket associated with an identified traffic shaping policy has insufficient capacity to support a transfer of the packet through the network and borrow bandwidth from the shared bandwidth bucket by a respective guaranteed bandwidth bucket to allow traffic to pass immediately through the network appliance.

Aspects of the invention can include one or more of the following advantages. Cascaded buckets are provided that support a guaranteed bandwidth for a policy while also allowing for sharing of that guaranteed bandwidth among other policies in the event that the bandwidth is under utilized. The shared bandwidth supports the elimination of static bandwidth allocation while guaranteed bandwidth is not compromised. By allowing the network appliance to share the unused guaranteed bandwidth, the bandwidth utilization of the network appliance can be dramatically improved.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a shows a block diagram for a network appliance that includes cascaded buckets.

FIG. 2 is a flow diagram of a process for passing data through the network appliance of FIG. 1.

FIG. 3 is a flow diagram of a method for incrementing a guaranteed bandwidth bucket.

Like reference symbols in the various drawings indicate like elements.

DETAILED DESCRIPTION

Referring now to FIG. 1, a network appliance 100 that includes traffic shaping policy tools is shown. Network appliance 100 includes a plurality of input ports 102 each of which includes an input queue 104, an output queue 106, a scheduler 108 and a forwarding engine 120. Associated with scheduler 108 are a token system 110, increment engine 112 and decrement engine 114.

As data is received at an input port 102, the data is transported into the input queue 104. Input queue 104 acts as a first in/first out buffer for holding packets that are received from the input port 102. Scheduler 108 periodically checks the status of token system 110 to determine whether or not a data packet stored in the input queue 104 can be passed to the output queue 106. When scheduler 108 determines that there are sufficient tokens in the token system 110, then a packet may be transferred from the input queue 104 to the output queue 106. Thereafter, packets can be passed in order from the output queue 108 to other portions of the network appliance by forwarding engine 120. At a predetermined rate, increment engine 112 adds tokens to the token system 110. Similarly, as packets are transferred from the input queue 104 to the output queue 106, decrement engine 114 removes the appropriate amount of tokens from the token system 110.

Token system 110 includes a plurality of traffic shaping policy buckets. As described above, a traffic shaping policy is a convention used to ensure levels of service to users of the network appliance. A policy is any user-defined criteria for grouping input received at the network appliance. The policy can be based on IP address or other constraints in order to manage the traffic from one particular user defined group. One or more policies can be evaluated for each packet. For example, one policy may screen based on an IP address for the packet sender. Another policy may screen based on a destination IP address. Other parameters other than IP address can be used in constructing a traffic shaping policy.

In one implementation, for each policy, token system 110 includes at least three buckets 130$a$, 130$b$ and 130$c$. Each first bucket 130$a$, also referred to as a maximum bandwidth allocation bucket, is configured as a conventional token bucket that has a SIR that is equal to the maximum rate at which data of the policy type can be sent. Tokens are added to the first bucket 130$a$ at a rate to limit the bandwidth allocated for the given policy to the maximum bandwidth allocation assigned to the given policy. If the balance (in tokens) in the maximum bandwidth bucket 130$a$ is greater than or equal to zero, then the scheduler 108 will allow the packet to pass from the input queue 104 to the output queue 106 (assuming that the balances in the second and third buckets are appropriate). However, if the balance in the maximum bandwidth bucket 130$a$ is less than zero, then no packets of this type (that include the policy parameter) will pass from the input queue 104 to the output queue 106 at this time. This guarantees that the particular policy cannot be oversubscribed.

Second bucket 130$b$ is a guaranteed bandwidth bucket. The guaranteed bandwidth bucket 130$b$ operates in a similar fashion to the maximum bandwidth bucket 130$a$ and includes an SIR set to be the guaranteed bandwidth allocation for the policy. When a packet is received (assuming that the maximum bandwidth allocation bucket has a balance that is greater than or equal to 0), then the balance of the guaranteed bandwidth bucket 130$b$ is checked to determine if the packet's size is greater than or less than the balance in the guaranteed bandwidth bucket 130$b$. If the balance of tokens is greater than the packet's size, then scheduler 108 allows the packet to be transferred from the input queue 104 to the output queue 106. If the balance is less than the packet's size, then an attempt is made to borrow from the third bucket 130$c$.

The third bucket is referred to as the shared bandwidth bucket 130$c$. The shared bandwidth bucket 130$c$ has tokens added every time one or more of the guaranteed bandwidth buckets reaches its peak allocation. At a next time one or more tokens are scheduled to be added to an otherwise full guaranteed bandwidth bucket 130b (tokens which would otherwise be discarded), the token(s) are stored in the shared bandwidth bucket 130c. In one implementation, the shared bandwidth bucket 130c is shared among plural members (guaranteed bandwidth buckets 130b) of the same traffic shaping policy group. Traffic shaping policies can be grouped together by many different criteria such as physical interface and priority. Policies can also be grouped in a hierarchical way such that there are subgroups in a group. In operation, if the balance of a guaranteed bandwidth bucket 130b for any member of a policy group is less than the packet size, an attempt is made to borrow from the shared bandwidth bucket 130c. If the borrowing attempt fails, that is, if there are insufficient tokens in the shared bandwidth bucket 130c, then the packet will not be transferred to the output queue 106. Alternatively, if there are sufficient tokens in the shared bandwidth bucket 130c to allow for a borrowing operation, then a sufficient number of credits are transferred to the guaranteed bandwidth bucket that attempted the borrowing. Thereafter, the scheduler enables the transfer of the packet from the input queue 104 to the output queue 106. After the transfer, the decrement engine 114 removes the appropriate number of tokens from the shared bandwidth bucket 130c (i.e., the number borrowed) and from the appropriate guaranteed bandwidth bucket 130b (i.e., the number of tokens required to pass the packet).

Referring now to FIG. 2, a process used by the scheduler 108 for determining when to transfer packets from the input queue 104 to the output queue 106 is shown. The process begins as the scheduler checks to determine if any packets are stored in the input queue (202). If not, the process waits for a packet to arrive and continues at step 202. Otherwise, a next packet in the input queue is identified (204). A check is made to determine if a policy screen should be applied to the packet (206). As described above, a policy screen includes one or more policy parameters. The policy parameters define the screening parameters for the policy. An example of a policy parameter is the packet's IP address. Packets can be screened based on destination, source or both. In addition, traffic can be screened based upon protocol type, UDP/TCP port number, type of service and traffic content such as websites. If no policy screen is to be applied, then the process continues at step 250 where the packet is transferred from the input queue 104 to the output queue 106.

If a policy is to be enforced, a check is made to determine if the size of the packet exceeds the balance of the maximum bandwidth bucket 130a associated with the identified policy (208). If the size exceeds the balance, then the process continues at step 202 without transferring the packet from the input queue 104 to the output queue 106. If the size does not exceed the balance in step 208, the scheduler checks to determine if the size of the packet exceeds the balance of the guaranteed bandwidth bucket 130b for the policy (210). If the size does not exceed the balance in step 210, then the process continues at step 250 where the packet is transferred from the input queue 104 to the output queue 106.

If the size exceeds the balance in step 210, then the scheduler determines if there are sufficient tokens in the shared bandwidth bucket 130c associated with the policy to pass the packet (212). If there are insufficient tokens in the shared bandwidth bucket 130c, the process continues at step 202 without transferring the packet from the input queue 104 to the output queue 106. If there are sufficient tokens in the shared bandwidth bucket 130c, then the appropriate amount of tokens is transferred (so that the balance in the guaranteed bandwidth bucket 130b equals or exceeds the size of the packet) from the shared bandwidth bucket 130c to the requesting guaranteed bandwidth bucket 130b (214). In one implementation, the tokens are physically transferred from the shared bandwidth bucket to the guaranteed bandwidth bucket during a borrowing operation. Alternatively, the tokens can be virtually passed, that is, allocated to the guaranteed bandwidth bucket without requiring them to be physically transferred. A check is made to determine if the packet needs to be screened against any other policies (216), if so, the next policy is identified (218) and the process continues at step 208.

In step 250, the scheduler 108 allows the transfer of the packet from the input queue 104 to the output queue 106. At the time of transfer, the appropriate number of tokens is decremented from the guaranteed bandwidth bucket and maximum bandwidth bucket for each policy used to screen the packet (252). Thereafter the process continues at step 202.

Referring now to FIG. 3, a flow diagram for a method for incrementing the guaranteed bandwidth buckets 130b is shown. The process begins by identifying a guaranteed bandwidth for the policy associated with the given guaranteed bandwidth bucket (302). A frequency for incrementing (304) and an amount of tokens to be added at each increment step are identified (306). A check is then made to determine if the guaranteed bandwidth bucket should be updated (based on the frequency data) (308). If not, the process continues at step 308 waiting for the next update period. If an update is warranted, then a check is made to determine if there is sufficient space in the guaranteed bandwidth bucket to accept the amount of tokens to be added (310). If there is enough space, then the tokens are added to the guaranteed bandwidth bucket (312) and the process continues at step 308.

If the check at step 310 fails, then the guaranteed bandwidth bucket is filled to its capacity (314). Thereafter, a check is made to determine if the guaranteed bandwidth bucket has an associated shared bandwidth bucket (316). If not, the process continues at step 308. If the guaranteed bandwidth bucket has an associated shared bandwidth bucket then a check is made to determine there is sufficient space in the shared bandwidth bucket to accept the amount of excess tokens (318). If there is not enough space, then the shared bandwidth bucket is filled to its capacity (320) and the process continues at step 308. If there is enough space, then all of the excess tokens are added to the shared bandwidth bucket (322) and the process continues at step 308.

Credit/Debit Guaranteed Bandwidth Bucket

In one implementation, the guaranteed bandwidth bucket 130b can be a credit/debit bucket. In this implementation, the maximum bandwidth bucket 130a is a conventional token bucket (i.e., no-debt bucket). The guaranteed bandwidth bucket 130b is a credit/debit bucket that is allowed to operate in a debt mode. The shared bandwidth bucket 130c is a conventional token (i.e., no-debt) bucket that includes the borrowing provisions set forth above.

In operation, the maximum bandwidth bucket 130a operates (is incremented and decremented) as described above to ensure the policy is not oversubscribed. Assuming that the number of tokens in the maximum bandwidth bucket is greater than or equal to zero, then the scheduler checks the guaranteed bandwidth bucket (the credit/debit version) to determine if the number of tokens is greater than the packet size. If so, then the packet is passed in the system and the appropriate number of tokens is debited from both the maximum bandwidth bucket and the guaranteed bandwidth bucket. If the number of tokens in the guaranteed bandwidth bucket 130b is greater than 0 however, less than the packet size then the packet passes, but there is no borrowing operation that occurs. The packet passes in accordance with the standard credit/debit protocol associated with a credit/debit bucket. If however the number of tokens in the guaranteed bandwidth bucket 130b is less than 0, the scheduler attempts to borrow (from an associated shared bandwidth bucket 130c, if any).

In one implementation, the scheduler may borrow only to cover the debt (incurred for passing the packet). Alternatively, in another implementation, the scheduler may borrow to cover the packet size itself. In a third implementation, the scheduler may borrow to cover both the debt as well as the packet size.

Two-Bucket System

In one implementation, token system 110 includes only cascaded pairs of buckets. In this implementation, token system 110 includes a plurality of guaranteed bandwidth buckets 130b, one or more for each policy that is supported, and one or more shared bandwidth buckets (to allow sharing among policies or in a policy). Each of the guaranteed bandwidth buckets operates as described above. The guaranteed bandwidth buckets can either be conventional token buckets, leaky buckets, or credit/debit buckets. When a guaranteed bandwidth bucket does not have sufficient tokens/space to allow a packet to pass, the scheduler can attempt to borrow from a shared bandwidth bucket associated with a given policy (or policies).

The shared bandwidth bucket can support plural different policies. The network appliance can provide a dynamic allocation of resources that supports both guaranteed bandwidth among policies and also a sharing of guaranteed bandwidth among members of one or more policies.

Priority Information

In an alternative implementation, when a guaranteed bandwidth bucket attempts to borrow from a shared bandwidth bucket, the scheduler considers priority data when determining whether borrowing is allowed. Each guaranteed bandwidth bucket can be assigned a priority. The priority data can be used to determine when borrowing is allowed. The priority data can be set based on use of the shared bandwidth bucket. Depending on the priority level setting for a given guaranteed bandwidth bucket, the borrowing operation may be disallowed. The priority level can be used to determine how a policy/policies will share the bandwidth in the shared bucket that is available. The higher priority policy can be allocated the shared bandwidth before a lower priority policy.

The present invention can be used by any traffic shaper to enforce traffic shaping policies. The traffic shaper can be a dedicated device such as a package shaper or a multi-function device with traffic shaping functionality such as a router or a firewall engine. The present invention allows a traffic shaper to dynamically allocate guaranteed bandwidth for a policy. System administrators can avoid the limitations of static allocations while guaranteed bandwidth is not compromised A number of embodiments of the invention have been described. Nevertheless, it will be understood that various modifications may be made without departing from the spirit and scope of the invention. Accordingly, other embodiments are within the scope of the following claims.

What is claimed is:

1. A method for allocating bandwidth in a network appliance, the method comprising:
    determining, by the network appliance, that a first policy is to be applied to a packet stored in an input queue of the network appliance;
    determining, by the network appliance and based on determining that the first policy is to be applied to the packet, whether a first bandwidth in a maximum bandwidth bucket is sufficient to allow the packet to pass immediately through the network appliance, where the first bandwidth is allocated to the maximum bandwidth bucket based on a maximum bandwidth allocation associated with the first policy;
    determining, by the network appliance and when the first bandwidth is determined to be sufficient to allow the packet to pass immediately through the network appliance, whether a second bandwidth in one of a plurality of guaranteed bandwidth buckets is sufficient to allow the packet to pass immediately through the network appliance, where the second bandwidth is allocated to the one of the plurality of guaranteed bandwidth buckets based on a guaranteed bandwidth allocation associated with the first policy;
    transferring, by the network appliance, a shared bandwidth from a shared bandwidth bucket to the one of the plurality of guaranteed bandwidth buckets when the second bandwidth in the one of the plurality of guaranteed bandwidth buckets is not sufficient to allow the packet to pass immediately through the network appliance, where the shared bandwidth is allocated to the shared bandwidth bucket based on an underutilization of bandwidth in any one of the plurality of bandwidth buckets;
    determining, by the network appliance and when the second bandwidth or the shared bandwidth is sufficient to allow the packet to pass immediately through the network appliance, whether a different policy is to be applied to the packet;
    determining, by the network appliance and when the different policy is to be applied to the packet, whether a third bandwidth in another one of the plurality of guaranteed bandwidth buckets is sufficient to allow the packet to pass immediately through the network appliance, where the third bandwidth is allocated to the other one of the plurality of guaranteed bandwidth buckets based on another guaranteed bandwidth associated with the different policy; and
    transferring bandwidth from the shared bandwidth bucket to the other one of the plurality of guaranteed bandwidth buckets when the third bandwidth, in the other one of the plurality of guaranteed bandwidth buckets, is not sufficient to allow the packet to pass immediately through the network appliance.

2. The method of claim 1, where the shared bandwidth bucket is a token bucket.

3. The method of claim 1, where the plurality of guaranteed bandwidth buckets are token buckets.

4. The method of claim 1, where the plurality of guaranteed bandwidth buckets are credit/debit buckets.

5. The method of claim 1, where each of the plurality of guaranteed bandwidth buckets is associated with a different traffic shaping policy.

6. The method of claim 5, where each of the different traffic shaping policies screen based on traffic content of the packet.

7. The method of claim 1, where the first policy and the second policy are associated with a single traffic shaping policy.

8. The method of claim 7, where the single traffic shaping policy screens based on IP address associated with the packet.

9. The method of claim 8, where the single traffic shaping policy screens based on a source IP address associated with the packet.

10. The method of claim 8, where the single traffic shaping policy screens based on a destination IP address associated with the packet.

11. The method of claim 8, where the single traffic shaping policy screens based on protocol type associated with the packet.

12. The method of claim 8, where the single traffic shaping policy screens based on UDP/TCP port number associated with the packet.

13. The method of claim 8, where the single traffic shaping policy screens based on a type of service associated with the packet.

14. A method for allocating bandwidth in a network appliance, the method comprising:
- defining a guaranteed bandwidth allocation for a first policy for passing a packet through the network appliance, where defining the guaranteed bandwidth allocation includes using a first bucket to allocate the guaranteed bandwidth;
- defining a different guaranteed bandwidth allocation for a second policy for passing the packet through the network appliance, where defining the different guaranteed bandwidth allocation includes using a different bucket to allocate the different guaranteed bandwidth;
- sharing excess bandwidth developed from an underutilization of the guaranteed bandwidth allocated to the first bucket and the different guaranteed bandwidth allocated to the different bucket including:
  - providing a shared bandwidth bucket associated with the first bucket and the different bucket;
  - borrowing bandwidth from the shared bandwidth bucket by the first bucket when the first bucket has insufficient bandwidth to allow the packet to pass immediately through the network appliance; and
  - borrowing bandwidth from the shared bandwidth bucket by the different bucket when the different bucket has insufficient bandwidth to allow the packet to pass immediately through the network appliance.

15. An apparatus for allocating bandwidth in a network appliance where the network appliance includes a plurality of guaranteed bandwidth buckets used to evaluate when to pass a packet through the network appliance, each of the plurality of guaranteed bandwidth buckets being allocated different amounts of bandwidth, the apparatus comprising:
- a shared bandwidth bucket associated with the plurality of guaranteed bandwidth buckets;
- one or more components to allocate bandwidth to the shared bandwidth bucket based on an underutilization of the different amounts of bandwidth allocated to the plurality of guaranteed bandwidth buckets; and
- a scheduler operable to:
  - evaluate the packet to determine whether to apply a traffic shaping policy to the packet,
  - determine, based determining to apply the traffic shaping policy, whether a maximum bandwidth bucket comprises sufficient capacity to support a transfer of the packet through the network appliance, where bandwidth is allocated to the maximum bandwidth bucket based on a maximum bandwidth associated with the traffic shaping policy,
  - evaluate, based on the maximum bandwidth bucket being determined to comprise the sufficient capacity, a guaranteed bandwidth bucket, of the plurality of guaranteed bandwidth buckets, associated with the traffic shaping policy,
  - determine when the guaranteed bandwidth bucket, of the plurality of guaranteed bandwidth buckets, associated with the traffic shaping policy comprises insufficient capacity to support the transfer of the packet through the network, and
  - borrow bandwidth from the shared bandwidth bucket by the guaranteed bandwidth bucket, of the plurality of guaranteed bandwidth buckets, to allow the packet to pass immediately through the network appliance.

16. A network device comprising:
- a first bucket to receive tokens at a first information rate, where the first information rate corresponds to a maximum bandwidth allocation associated with a packet to be transferred through the network device;
- a second bucket to receive tokens at a different information rate, where the different information rate corresponds to a guaranteed information rate associated with the packet;
- a third bucket to receive tokens at a third information rate, where the third information is different than the first information rate and the different information rate and corresponds to another guaranteed information rate associated with the packet;
- a fourth bucket to receive extra tokens from the second bucket and the third bucket; and
- a scheduler to:
  - determine whether a size of the packet exceeds a number of tokens stored in the first bucket,
  - determine, when the size of the packet does not exceed the number of tokens stored in the first bucket, whether the size of the packet exceeds a number of tokens stored in the second bucket,
  - transfer, when the size of the packet exceeds the number of tokens stored in the second bucket, an appropriate number of tokens from the fourth bucket to the second bucket so that the second bucket includes a number of tokens that equals or exceeds the size of the packet,
  - determine, whether the size of the packet exceeds a number of tokens stored in the third bucket, and
  - transfer, when the size of the packet exceeds the number of tokens stored in the third bucket, another appropriate number of tokens from the fourth bucket to the third bucket so that the third bucket includes a number of tokens that equals or exceeds the size of the packet.

17. The network device of claim 16, where the scheduler is further to:
- cause the packet to be forwarded after the transfer; and
- decrement the number of tokens in the first bucket, the second bucket, and the third bucket based on the size of the packet.

18. The network device of claim 16, where the scheduler is further to:
- determine whether the fourth bucket includes the appropriate number of tokens and the other appropriate number of tokens, and
- prohibit the traffic from being forwarded when the fourth bucket includes less than the appropriate number of tokens and the other appropriate number of tokens.

19. The network device of claim 16, further comprising:
- one or more input ports to receive traffic from a network, each of the one or more input ports including another first bucket, another second bucket, another third bucket, another fourth bucket, and another scheduler.

20. A method comprising:
- determining, by a network device, whether a policy is to be applied to traffic;
- determining, by the network device and when the policy is to be applied to the traffic, whether a size of the traffic exceeds a number of tokens in a first bucket, the first bucket being associated with the policy;
- determining, by the network device and when the size of the traffic does not exceed the number of tokens in the first bucket, whether the size of the traffic exceeds a number of tokens in a second bucket;

determining, by the network device and when the size of the traffic exceeds the number of tokens in the second bucket, whether a third bucket includes an appropriate number of tokens that, when added to the number of tokens in the second bucket, would equal or exceed the size of the traffic;

transferring, by the network device, the appropriate number of tokens from the third bucket to the second bucket when the third bucket includes the appropriate number of tokens;

determining, by the network device, whether a different policy is to be applied to the traffic;

determining, by the network device and when the different policy is to be applied to the traffic, whether a size of the traffic exceeds a number of tokens in another first bucket, the other first bucket being associated with the different policy;

determining, by the network device and when the size of the traffic does not exceed the number of tokens in the other first bucket, whether the size of the traffic exceeds the number of tokens in another second bucket;

determining, by the network device and when the size of the traffic exceeds the number of tokens in the other second bucket, whether the third bucket includes an appropriate number of tokens that, when added to the number of tokens in the other second bucket, would equal or exceed the size of the traffic;

transferring, by the network device, the appropriate number of tokens from the third bucket to the other second bucket when the third bucket includes the appropriate number of tokens; and forwarding, by the network device, the traffic after the transferring of the appropriate number of tokens from the third bucket to the other second bucket.

* * * * *